(No Model.)

T. R. CRANE.
COMBINED GRAIN DRILL, SEED SOWER, FERTILIZER DISTRIBUTER, AND ROLLER.

No. 331,687. Patented Dec. 1, 1885.

Witnesses:
Edward A. Osse,
John E. Morris.

Inventor.
Thos. R. Crane
By Chas. B. Mann
Attorney.

UNITED STATES PATENT OFFICE.

THOMAS R. CRANE, OF HEATHSVILLE, VIRGINIA.

COMBINED GRAIN-DRILL, SEED-SOWER, FERTILIZER-DISTRIBUTER, AND ROLLER.

SPECIFICATION forming part of Letters Patent No. 331,687, dated December 1, 1885.

Application filed July 17, 1885. Serial No. 171,847. (No model.)

*To all whom it may concern:*

Be it known that I, THOMAS R. CRANE, a citizen of the United States, residing at Heaths-ville, in the county of Northumberland and State of Virginia, have invented certain new and useful Improvements in Combined Grain-Drill, Seed-Sower, Fertilizer-Distributer, and Roller, of which the following is a specification.

My invention relates to a planter in which is combined a grain-drill, seed-sower, fertilizer-distributer, and land-roller. The object is to provide a machine by which wheat or other grain and grass-seed may be planted in connection, fertilizer distributed, and finally the ground rolled, all in one operation.

The invention consists in the construction, arrangement, and combination of parts, which will first be described and then claimed.

Figure 1:
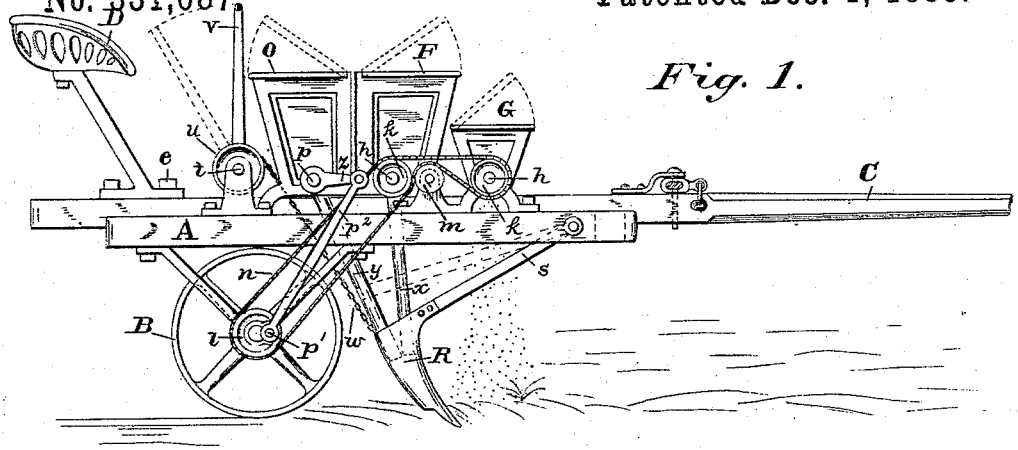
Figure 2:
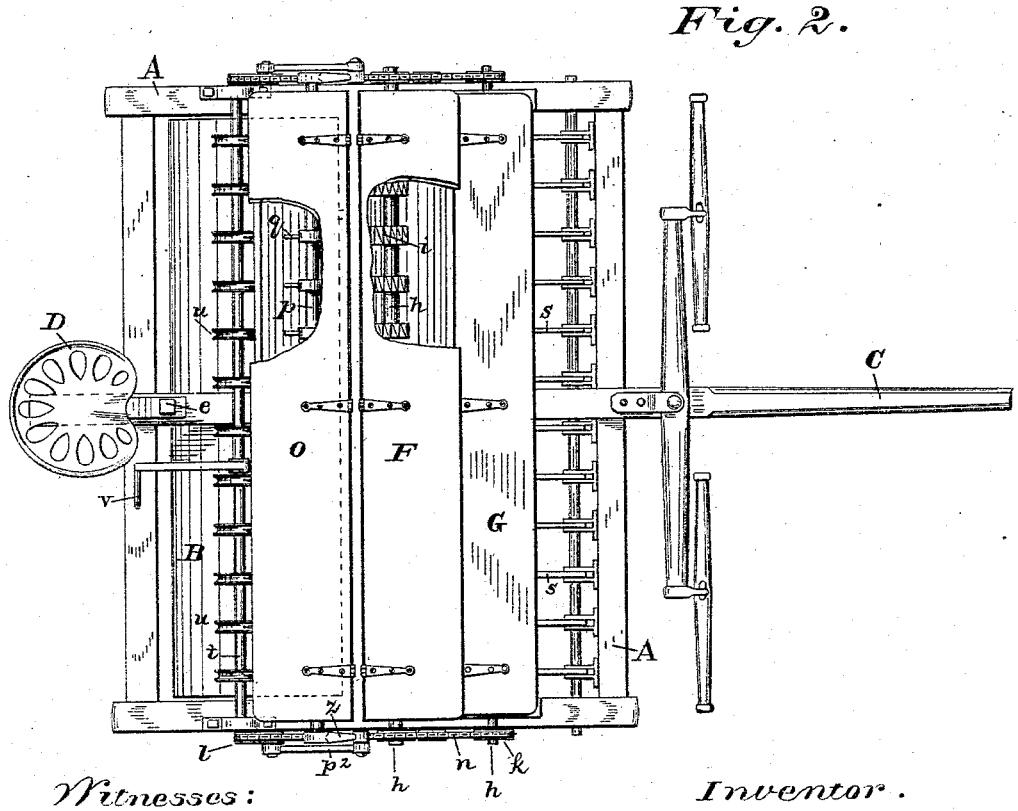

In the drawings herewith, Figure 1 is a side elevation of the combined machine. Fig. 2 is a top view of the same.

The letter A designates the wooden frame, wholly supported by resting upon the journals of a roller, B, which is at the rear of the frame. The pole C is attached to the frame and extends to the rear part thereof, and the seat D is mounted thereon, and by means of the bolts $e$ may be shifted back or forward, so that when a driver occupies the seat the weight of the forward part of the frame will not bear heavily on the necks of the animals. The several boxes for the grain, grass-seed, and fertilizer are each separate, and all have position on the frame and in front of the roller. A grain box or hopper, F, and a grass-seed box or hopper, G, are so bolted to the frame as to readily admit of a change of their position. Each box has a shaft, $h$, extending through it, and force-feed devices $i$, of any desired or well-known kind, are operated by the said shaft and cause the grain and grass-seed to be discharged therefrom. The end of each shaft has outside of the box a sprocket-wheel, $k$, and a combined drive sprocket and crank wheel, $l$, is mounted on one of the roller-journals. An idle-roller, $m$, is mounted on the frame between the sprocket-wheels of the grain and grass box, and an endless chain, $n$, passes around the drive sprocket-wheel $l$, and thence engages the sprocket-wheel on the shaft of the grain-box. One part of the chain then passes over the idle-roller, which serves to keep the chain in contact therewith, and then passes around the sprocket-wheel on the shaft of the seed-box. By this arrangement the one chain drives the force-feed devices of the two boxes. A fertilizer box or hopper, O, is bolted upon the frame and has discharge-openings in its concave bottom. A rock-shaft, $p$, extends lengthwise of this hopper and has attached thereto a number of arms, $q$, which swing or vibrate crosswise of the bottom, and thereby cause the discharge of the fertilizer through the openings. A fertilizer-box of this construction is shown and described in Letters Patent of the United States granted me June 2, 1885, and numbered 319,393. The sprocket-wheel on the roller-journal has a crank-wrist, $p'$. The rock-shaft has on its end an arm, $z$, and a rod, $p^2$, connects the crank-wheel wrist with the arm of the fertilizer rock-shaft. As the said arm is longer than the crank, the rotation of the latter will cause the former to vibrate. Tubular drill-hoes R are attached below the frame by means of drag-bars $s$, which are pivoted to the front of the frame and allow the drill-hoes to be elevated. A rock-shaft, $t$, above the frame and over the ground-roller has pulleys $u$, and a hand-lever, $v$, by which it is partly turned or caused to rock. Each drill-hoe is connected to one of the pulleys $u$ by a chain, $w$, and therefore a shift in the position of the hand-lever $v$ will raise and lower all the drill-hoes. A flexible tube, $x$, leads from each discharge-opening of the grain-hopper into one of the drill-hoes, and another tube, $y$, leads from each discharge-opening of the fertilizer-hopper into one of the drill-hoes. In this way each drill-hoe has two tubes leading into it.

From the foregoing description it will be seen the grass-seed will be sown broadcast; the grain-hopper and drill-hoes will both drill the grain and partly cover the grass-seed; the fertilizer will also be distributed and drilled in; and, finally, the roller following all will press the earth firmly to the seed and thereby prevent the evaporation of moisture which insures prompt germination and vigorous growth. By one operation, therefore, grass-seed is sown, both grain and fertilizer are drilled, and then by the roller the land is left in the best possible condition to be subsequently worked by machinery.

If desired, the grain may be sown broadcast, and, as before stated, the boxes or hoppers may have their positions changed to effect the desired end. When the grain is sown broadcast, it must drop in advance of the drag, which will cover it, and the other devices, including the land-roller, will work as already described.

I am aware that heretofore land-rollers, fertilizer-distributers, grain-hoppers, and seed-sower hoppers have each and all been used in various combinations. I do not therefore claim, broadly, a combination of said devices; but my invention relates to the construction, arrangement, and combination of said devices, as specified hereinafter in the claim.

Having described my invention, I claim and desire to secure by Letters Patent of the United States—

A machine having, in combination, a land-roller, B, having its journals provided with a combined drive sprocket and crank wheel, $l$, a frame, A, wholly supported on the land-roller and provided with a rigidly-attached draft-pole, C, which extends to the rear part thereof, and having a shifting seat on the said rear end of the draft-pole, a fertilizer-distributer, O, having a rock-shaft provided with an arm, $z$, a grain-hopper, F, and a seed-hopper, G, each provided with feed devices and a shaft to operate the same, the said shafts each having a sprocket-wheel, $k$, a rod, $p^2$, connecting the crank-wheel and fertilizer rock-shaft arm, and an endless chain passed around the drive sprocket-wheel, and thence over the said two sprocket-wheels $k$ on the shafts of the grain and seed hopper, all constructed and arranged as hereinbefore set forth.

In testimony whereof I affix my signature in presence of two witnesses.

THOMAS R. CRANE.

Witnesses:
   JNO. T. MADDOX,
   JOHN E. MORRIS.